(12) United States Patent
Bing et al.

(10) Patent No.: US 8,813,712 B2
(45) Date of Patent: Aug. 26, 2014

(54) PISTON FOR AN INTERNAL COMBUSTION ENGINE AND METHOD FOR ITS PRODUCTION

(75) Inventors: Karlheinz Bing, Remseck (DE); Michael T. Lapp, Bloomfield, MI (US); Rainer Scharp, Vaihingen (DE); Michael Ullrich, Moeglingen (DE)

(73) Assignee: MAHLE International GmbH, Stuttgart (DE)

( * ) Notice: Subject to any disclaimer, the term of this patent is extended or adjusted under 35 U.S.C. 154(b) by 479 days.

(21) Appl. No.: 13/066,560

(22) Filed: Apr. 18, 2011

(65) Prior Publication Data
US 2012/0222644 A1  Sep. 6, 2012

(30) Foreign Application Priority Data
Mar. 4, 2011  (DE) .......................... 10 2011 013 113

(51) Int. Cl.
*F02F 3/16* (2006.01)
*F02F 3/26* (2006.01)
(52) U.S. Cl.
USPC .............. 123/193.6; 92/186; 92/256; 92/213; 92/216; 92/219
(58) Field of Classification Search
USPC .......... 92/186, 256, 213, 216–219; 123/193.6
See application file for complete search history.

(56) References Cited

U.S. PATENT DOCUMENTS

| | | | |
|---|---|---|---|
| 4,651,631 A | 3/1987 | Avezou | |
| 5,052,280 A | 10/1991 | Kopf et al. | |
| 5,778,533 A | 7/1998 | Kemnitz | |
| 6,722,263 B2 * | 4/2004 | Keller et al. | 92/186 |
| 7,051,684 B2 | 5/2006 | Bauer | |
| 7,341,037 B2 | 3/2008 | Parker et al. | |
| 7,721,431 B2 * | 5/2010 | Parker et al. | 29/888.042 |
| 8,074,617 B2 | 12/2011 | Grahle et al. | |
| 8,240,039 B2 | 8/2012 | Kondoh et al. | |
| 2004/0055460 A1 | 3/2004 | Kohnert | |
| 2008/0121204 A1 * | 5/2008 | Scharp | 123/193.6 |
| 2012/0024255 A1 | 2/2012 | Grahle et al. | |

FOREIGN PATENT DOCUMENTS

| | | |
|---|---|---|
| DE | 36 43 039 A1 | 6/1988 |
| DE | 44 46 726 | 6/1996 |
| DE | 101 32 446 A1 | 1/2003 |
| DE | 102 09 168 A1 | 9/2003 |

(Continued)

OTHER PUBLICATIONS

International Search Report of PCT/DE2012/000232, Oct. 22, 2012.

*Primary Examiner* — Lindsay Low
*Assistant Examiner* — Kevin Lathers
(74) *Attorney, Agent, or Firm* — Collard & Roe, P.C.

(57) ABSTRACT

A piston for an internal combustion engine has a piston head, a piston skirt, and a circumferential recess configured between the piston head and the piston skirt. The piston has a piston base body and a piston ring element. The piston base body has a crown region of a combustion bowl and the piston skirt. The piston ring element has a piston crown, a wall region of the combustion bowl, a circumferential top land, and a circumferential ring belt with ring grooves. The piston ring element has a circumferential cooling channel between the wall region of the combustion bowl and the ring belt, closed with a closure element. The piston base body and the piston ring element have a circumferential joining seam in the region of the combustion bowl, by way of which seam they are non-releasably connected with one another.

7 Claims, 4 Drawing Sheets

(56) References Cited

FOREIGN PATENT DOCUMENTS

| DE | 102 14 830 A1 | 1/2004 |
| DE | 10 2004 019 010 A1 | 11/2005 |
| DE | 601 22 533 T2 | 4/2007 |
| DE | 10 2008 046 115 A1 | 3/2009 |
| DE | 10 2007 061 601 A1 | 6/2009 |
| WO | WO 2007/144111 A1 | 12/2007 |

* cited by examiner

PISTON FOR AN INTERNAL COMBUSTION ENGINE AND METHOD FOR ITS PRODUCTION

CROSS REFERENCE TO RELATED APPLICATIONS

Applicants claim priority under 35 U.S.C. §119 of German Application No. 10 2011 013 113.2 filed on Mar. 4, 2011, the disclosure of which is incorporated by reference.

BACKGROUND OF THE INVENTION

1. Field of the Invention

The present invention relates to a piston for an internal combustion engine, having a piston head, a piston skirt, and a circumferential recess configured between the piston head and the piston skirt. The present invention furthermore relates to a method for the production of such a piston.

2. The Prior Art

A piston of this type is known, for example, from DE 44 46 726 A1, and is also referred to as a "piston having a thermally uncoupled piston skirt." Such pistons are characterized by great strength and by great heat resistance, because of the thermal uncoupling of piston head and piston skirt. Their relatively great construction height, which results from a minimum height of the ring-shaped recess, required due to process technology, is disadvantageous.

SUMMARY OF THE INVENTION

The task of the present invention consists in further developing a piston of the stated type, in such a manner that the construction height is reduced, while the good mechanical and thermal properties remain the same.

The solution consists in that the piston has a piston base body and a piston ring element, that the piston base body has at least a crown region of a combustion bowl as well as the piston skirt, that the piston ring element has at least a piston crown, a wall region of the combustion bowl, a circumferential top land, and a circumferential ring belt provided with ring grooves, that the piston ring element has a circumferential cooling channel between the wall region of the combustion bowl and the ring belt, closed with a closure element, that the piston base body and the piston ring element have a circumferential joining seam in the region of the combustion bowl, by way of which seam they are non-releasably connected with one another.

Furthermore, an object of the invention is a method for the production of such a piston, having the following method steps: (a) making available a blank of a piston base body that has at least a crown region of a combustion bowl, a piston skirt, as well as a joining surface in the region of the combustion bowl; (b) making available a blank of a piston ring element that has at least a piston crown, a wall region of the combustion bowl, a circumferential recess, as well as a joining surface in the region of the combustion bowl; (c) connecting the blank of the piston base body with the blank of the piston ring element by way of their joining surfaces, to produce a piston blank; (d) reworking and/or finishing the piston blank to produce the piston.

The idea according to the invention consists in providing a piston having a thermally uncoupled piston skirt with a piston ring element configured as a separate component. The recess, which serves as a circumferential cooling channel in the finished piston, can be worked into the piston ring element in any desired size and construction height, and thus in advance. This eliminates the need to configure the circumferential recess, which brings about the thermal uncoupling of the piston skirt, with such a large construction height that production of the cooling channel by means of chip-cutting machining, as known for pistons according to the state of the art, is made possible in the first place. The piston according to the invention therefore makes it possible to freely select the height of the circumferential recess and thus the construction height, and to keep it as low as possible, if necessary.

Advantageous further developments are evident from the dependent claims.

A preferred further development consists in that the joining seam encloses an acute angle with the center axis of the piston. This configuration allows particularly simple use of a welding method for joining the piston components. In the case of beam welding, for example laser welding, the direction of the exiting weld beads can be controlled in such a manner that they remain outside of the cooling channel and do not impact the closure element.

It is practical if the closure element is held on the piston ring element in the region of the ring belt. This configuration allows particularly simple installation of the closure element.

Particularly preferably, the end of the joining seam on the cooling channel side lies outside of the cooling channel. In this manner, depending on the joining method used, material residues such as weld ridges that might be present are removed in simple manner. Furthermore, it is avoided that such material residues constrict or contaminate the cooling channel.

Another particularly preferred embodiment consists in that the free edge of the closure element is disposed above the joining seam. This embodiment allows already closing the recess in the blank of the piston ring element, before it is connected with the blank of the piston base body. This is particularly advantageous if the blanks of the piston ring element and of the piston base body are to be connected with one another by means of beam welding, particularly laser welding. The weld beads that occur during this joining method cannot get into the cooling channel during the joining process in this case, and constrict or contaminate it. In this case, the closure element can also be permanently attached in the region of the ring belt even before joining. However, the closure element can also be reversibly or interchangeably affixed before joining, and, for example in the case of contamination with weld beads, can be replaced with a clean closure element subsequent to the joining process.

Of course, the closure element can also be affixed to the piston only after the joining process, forming the cooling channel.

The closure element is preferably configured as a one-piece or multi-piece sheet-metal component. In the installed state, its free end can lie against the piston, or be spaced apart from the piston in the form of a gap. The closure element can also be configured as a one-piece or multi-piece spring sheet. Then the closure element can be attached to the piston in such a manner that its free edge lies against the piston under bias, in order to close the cooling channel in particularly secure manner.

It is practical if the closure element has at least one entry opening and at least one exit opening for cooling oil. In this connection, at least one inlet opening can has a sleeve-shaped guide element for the cooling oil, which element projects into the cooling channel. Such a guide element can be formed into the closure element, for example, during its production.

The present invention is suitable for all piston construction variants according to the claims. The piston base body or its blank can also have part of the wall region, aside from the crown region of the combustion chamber bowl.

BRIEF DESCRIPTION OF THE DRAWINGS

An exemplary embodiment of the present invention will be explained in greater detail below, using the attached drawings. These show, in a schematic representation, not true to scale.

DETAILED DESCRIPTION OF THE PREFERRED EMBODIMENTS

Figure 1:
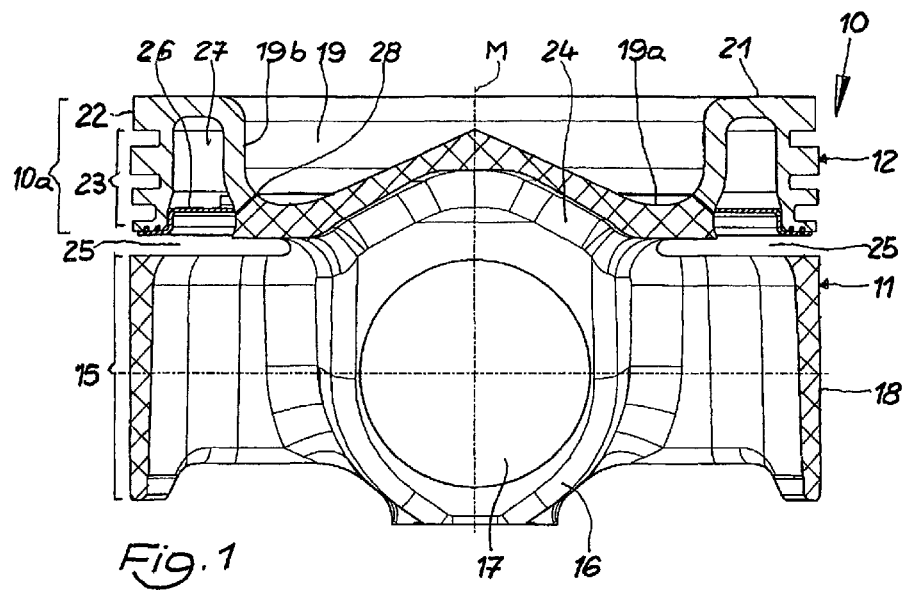
FIG. 1 an exemplary embodiment of a piston according to the invention, in section.
Figure 2:
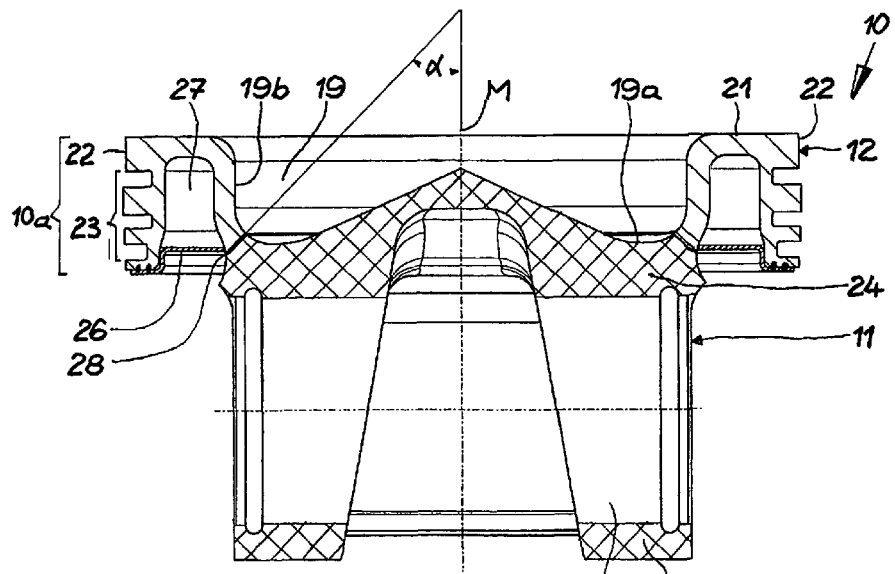
FIG. 2 the piston according to FIG. 1, in section, in a representation rotated by 90°.

FIGS. 1 and 2 show a particularly preferred exemplary embodiment of a piston 10 according to the invention. The piston 10 has a piston base body 11 and a piston ring element 12. Both components can consist of any desired metallic material that is suitable for joining the components. The piston base body 11 and the piston ring element 12 together form the piston head 10a and the piston skirt 15 of the piston 10.

The piston base body 11 has a piston skirt 15 that is provided, in known manner, with pin bosses 16 and pin bores 17 for accommodating a piston pin, as well as with working surfaces 18. The piston ring element 12 has a piston crown 21 as well as a circumferential top land 22 and a circumferential ring belt 23 for accommodating piston rings.

The piston 10 or the piston head 10a is furthermore provided with a combustion bowl 19. In this connection, the piston base body 11 has a crown region 19a of the combustion bowl 19, while the piston ring element 12 has a wall region 19b of the combustion bowl 19.

The pin bosses 16 of the piston base body 11 are suspended on the underside of the crown region 19a of the combustion bowl 19 by way of pin boss links 24. The piston skirt 15 is separated from the ring belt 23 by means of a circumferential, ring-shaped recess 25. Thus, the piston skirt 15 is thermally uncoupled from the piston head 10a.

The piston ring element 12 has a circumferential cooling channel 27, closed with a closure element 26, between the wall region 19b of the combustion bowl 19 and the ring belt 23.

The piston base body 11 and the piston ring element 12 are connected with one another by means of joining, in the exemplary embodiment preferably by means of laser welding. As a result, a joining seam 28 is formed in the region of the combustion bowl 19, which seam encloses an acute angle α with the center axis M of the piston 10 in this particularly preferred exemplary embodiment.

The configuration of the piston 10 according to the invention, with a piston base body 11 and a piston ring element 12, makes it possible to form the recess 27a that forms the subsequent cooling channel 27 into the piston ring element 12 in advance, in any desired size and construction height. This eliminates the need to configure the circumferential recess 25, which brings about thermal uncoupling of the piston skirt 15 from the piston head 10a, with such a large construction height that production of the cooling channel by means of chip-cutting machining, as known for pistons according to the state of the art, is made possible in the first place. The piston 10 according to the invention therefore makes it possible to keep the height of the circumferential recess 25 and thus the construction height, as shown in FIG. 1, as low as possible.

Figure 3:
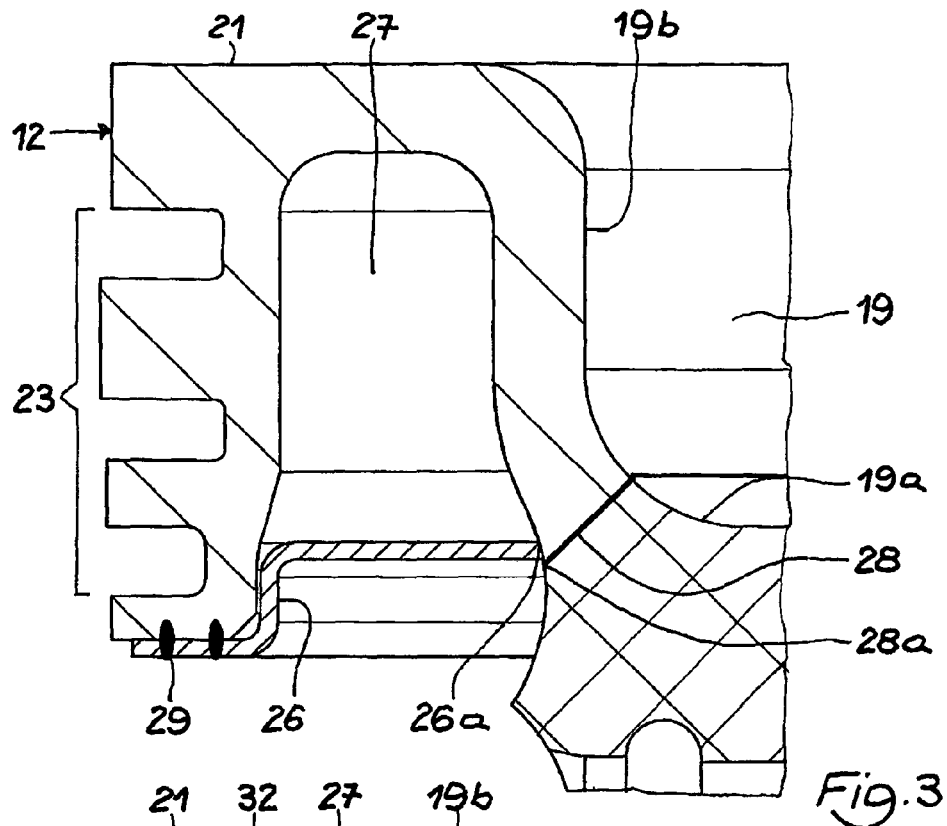
FIG. 3 an enlarged representation of the piston ring element of the piston according to FIG. 1, having a closure element.

FIG. 3 shows an enlarged detail picture of the piston ring element 12 of the piston 10 according to FIG. 1. In the particularly preferred exemplary embodiment shown, the cooling channel 27 is closed by means of a closure element 26. The closure element 26 can be configured in one piece or in multiple pieces. The closure element 26 is attached to the underside of the ring belt 23 of the piston ring element 12, in the exemplary embodiment, by means of weld points 29. Of course, the closure element 26 can be connected with the piston 10 by means of any other desired methods. The free edge 26a of the closure element 26 lies on the back of the wall region 19b of the combustion bowl 19 of the piston ring element 12 in the exemplary embodiment. The free edge 26a of the closure element 26 can also be spaced apart from the back of the wall region 19b of the combustion bowl in the form of a gap. If the closure element 26 is configured as a spring sheet, its free edge 26a can also lie against the back of the wall region 19b of the combustion bowl 19 under bias.

This particularly preferred embodiment of the piston 10 according to the invention includes that the end 28a of the joining seam 28, on the cooling channel side, lies outside of the cooling channel 27. This measure makes it possible to already attach the closure element 26 to the blank of the piston ring element 12 even before it is connected with the blank of the piston base body 11. This allows particularly simple use of a welding method for joining the piston components, preferably a beam welding method, particularly preferably a laser welding method. The weld beads that occur during these joining methods cannot enter into the cooling channel 27 during the joining process, in this case, and constrict or contaminate the latter. The closure element 26 can already be permanently attached to the blank of the piston ring element 12 even before joining. However, the closure element 26 can also be reversibly or interchangeably affixed before joining, and, for example in the case of contamination with weld beads, replaced with a clean closure element 26 subsequent to the joining process.

Figure 4:
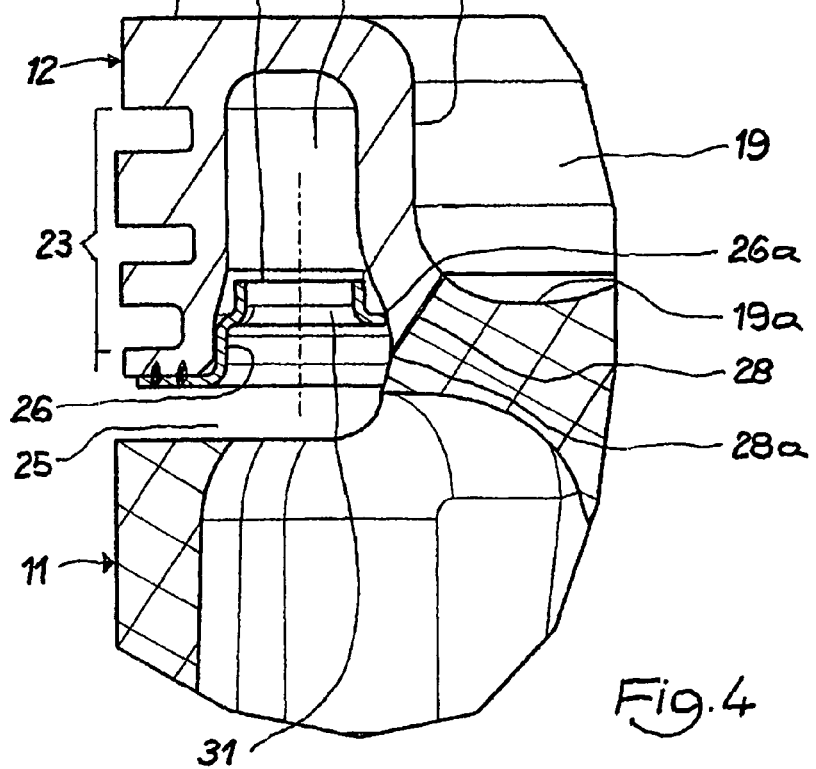
FIG. 4 an enlarged representation of a collar in the closure element according to FIG. 3.
Figure 5:
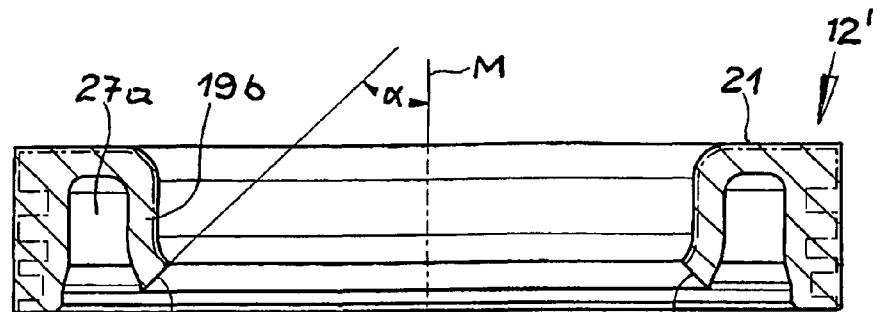
FIG. 5 an exemplary embodiment of a blank of a piston ring element for a piston according to the invention, in section.
Figure 6:
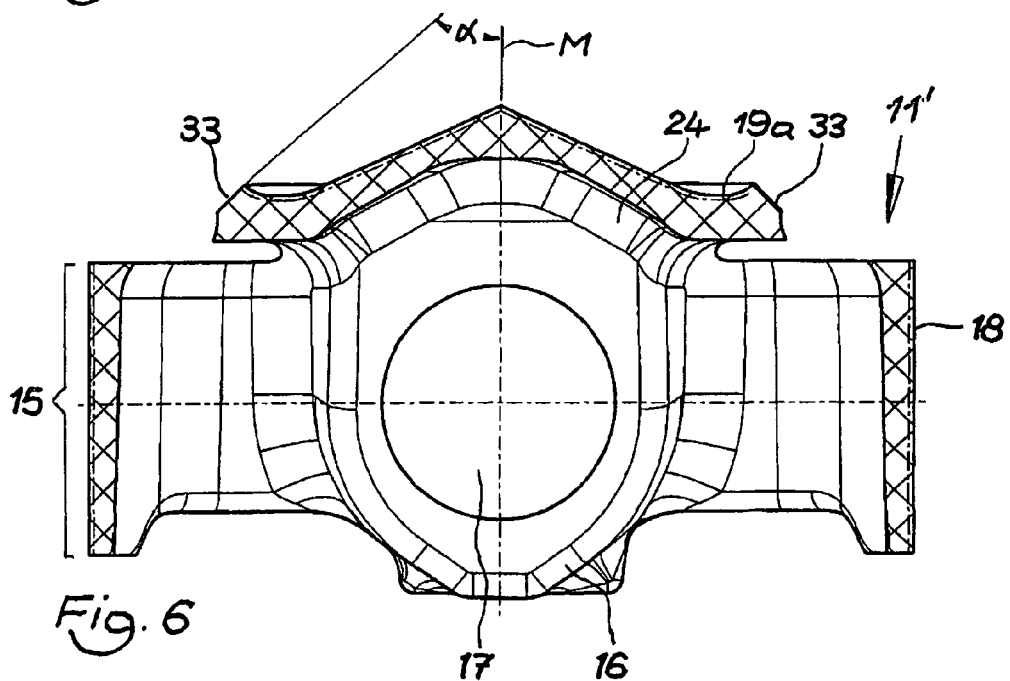
FIG. 6 an exemplary embodiment of a blank of a piston base body for a piston according to the invention, in section.

FIG. 4 shows another representation of the closure element 26 of the piston 10. In this representation, it can be seen that the closure element 26 has an entry opening 31 for cooling oil. The entry opening 31 is provided with a sleeve-shaped guide element 32 that projects into the cooling channel 27 and serves, in known manner, to guide the cooling oil passed into the cooling channel 27. The closure element 26 furthermore has at least one exit opening for cooling oil (not shown), in known manner.

The piston 10 according to the invention is particularly preferably produced in the manner described below.

First, a pre-machined blank 11' of a piston base body 11, in the exemplary embodiment, as well as a pre-machined blank 12' of a piston ring element 12, in the exemplary embodiment, are made available, according to FIGS. 5 to 8.

The blanks 11', 12' essentially correspond to the finished piston base body 11 and the finished piston ring element 12, respectively, so that the same structures are provided with the same reference symbols, and reference is made, in this regard, to the above description of FIGS. 1 and 2. Two essential differences consist in that the pin bores 17 are not structured in finished manner in the blank 11' of the piston base body 11, and that the ring grooves are absent in the blank 12' of the piston ring element 12.

Depending on the selection of the material, the blanks 11', 12' can be cast, forged, or sintered by means of powder metallurgy. In the exemplary embodiment, the crown region 19a of the combustion bowl 19 is formed into the blank 11' of the piston base body 11. This results in a circumferential joining surface 33 that encloses the same acute angle α with the center axis M of the blank 11', which is identical with the center axis M of the finished piston 10, that the joining seam 28 in the finished piston 10 encloses with the center axis M.

In the exemplary embodiment, the wall region 19b of the combustion bowl 19 is formed into the blank 12' of the piston ring element 12. This results in a circumferential joining surface 34 that encloses the same acute angle α with the center axis M of the blank 12', which is identical with the center axis M of the finished piston 10, that the joining seam 28 in the finished piston 10 encloses with the center axis M.

Figure 8:
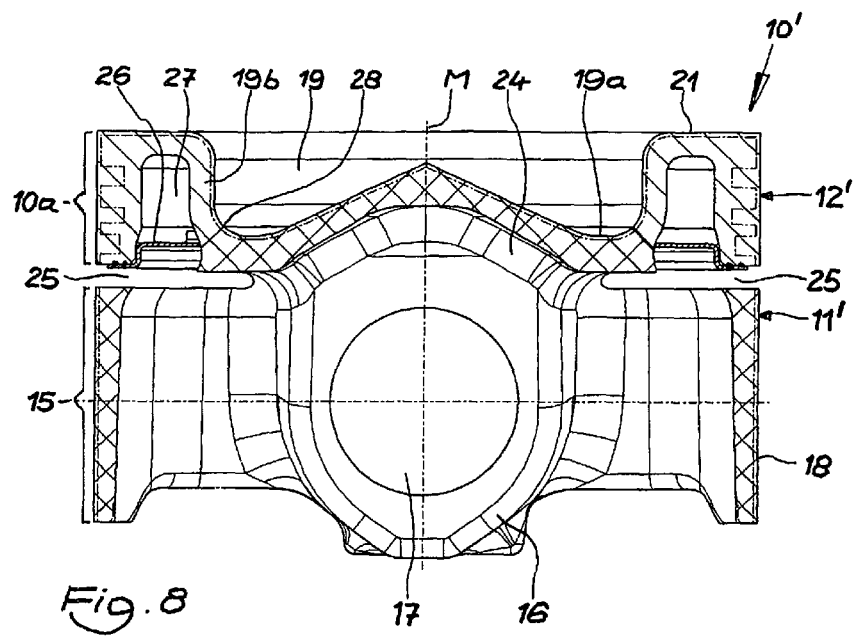
FIG. 8 a piston blank composed of the components according to FIGS. 6 and 7.

The joining surfaces 33, 34 of the blank 11' of the piston base body 11 or of the piston blank 12' of the piston ring element 12, respectively, correspond with one another in such a manner that the blanks 11', 12' can be joined together to produce a piston blank 10' (see FIG. 8).

Figure 7:
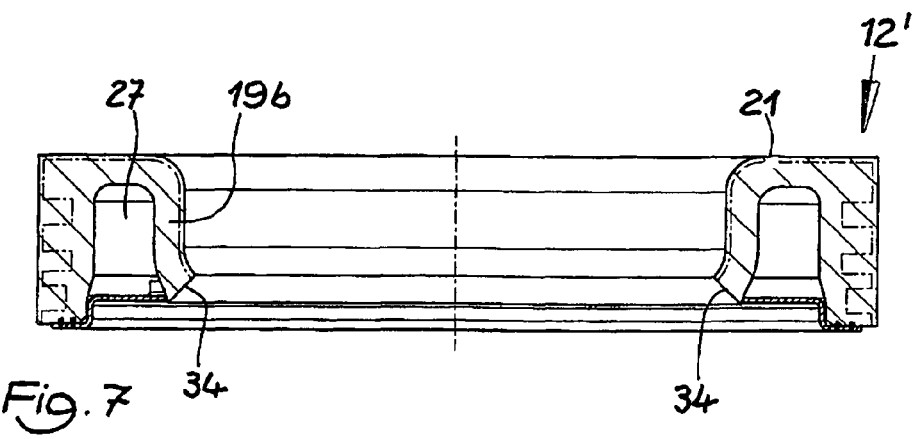
FIG. 7 the blank of a piston ring element according to FIG. 5, with a closure element attached to it.

In the exemplary embodiment, the recess 27a provided in the blank 12' of the piston ring element 12 is closed with a closure element 26 in the form of a metal sheet, forming a cooling channel 27 (see FIG. 7). The metal sheet can be in one piece or multiple pieces; furthermore, a plain metal sheet or a spring sheet can be used. The closure element 26 is attached on the underside of the ring belt 23 of the blank 12' of the piston ring element 12, in the exemplary embodiment, by means of weld points 29. The free edge 26a of the closure element 26 is positioned on the back of the wall region 19b of the combustion bowl 19 of the piston blank 12' of the piston ring element 12, in the exemplary embodiment. The free edge 26a of the closure element 26 can lie against the back of the wall region 19b, but can also be spaced apart from the back of the wall region 19b, in the form of a gap. If a spring sheet is used as the closure element 26, the free edge 26a can also lie against the back of the wall region 19b under bias.

Of course, the closure element 26 can also be releasably connected with the blank 12' of the piston ring element 12 and removed again after the joining process (see below).

Subsequent to this, the blank 11' of the piston base body 11 and the blank 12' of the piston ring element 12 are connected by way of the joining surfaces 33, 34, in non-releasable manner, to form a piston blank 10' (see FIG. 8).

The exemplary embodiment of the piston 10 according to the invention shown here, and the production method according to the invention, respectively, allow connecting the blanks 11', 12' with one another by means of beam welding, particularly laser welding, in particularly advantageous manner. The weld beads that occur during this joining method cannot get into the cooling channel 27 during the joining process, and constrict or contaminate the latter, since the cooling channel 27 is permanently or releasably closed by means of the closure element 26. In the latter case, the closure element 26 can be replaced with a clean closure element 26, for example in the event of contamination with weld beads, subsequent to the joining process. Since the joining surfaces 33, 34 furthermore enclose an acute angle α with the center axis M of the blanks 11', 12', the direction of the weld beads that exit during beam welding can be controlled in such a manner that they remain outside of the cooling channel 27. The weld beads can impact on the closure element 26, for example, which can subsequently be replaced, if necessary. However, the weld beads can also exit into the open or impact on the inside of the piston skirt, where they either remain or can be removed during the course of known reworking.

Since the end 28a of the joining seam 28 on the cooling channel side lies outside of the cooling channel 27 in the particularly preferred embodiment, any material residues such as weld ridges can be easily removed, if necessary, depending on the joining method used. Furthermore, it is avoided that such material residues constrict or contaminate the cooling channel 27.

Of course, the closure element 26 can also be affixed to the piston 10 only after the joining process, forming the cooling channel 27.

The piston blank 10' is reworked or finished in known manner, depending on the configuration of the blanks 11', 12'. For example, the outer shape, surfaces, combustion chamber bowl, ring belt, pin bores, etc. can be finished. In the end result, the piston 10 described above, according to FIGS. 1 and 2, is obtained.

In the end result, a piston 10 having an uncoupled skirt is obtained, whose circumferential recess 25, which brings about the thermal uncoupling of the piston skirt, can be produced with a freely selectable construction height, which is kept as low as possible, if necessary.

The invention claimed is:

1. Piston (10) for an internal combustion engine, having a piston head (10a), a piston skirt (15), and a circumferential recess (25) configured between the piston head (10a) and the piston skirt (15), wherein
    the piston (10) has a piston base body (11) and a piston ring element (12),
    the piston base body (11) has a crown region (19a) of a combustion bowl (19) as well as the piston skirt (15),
    the piston ring element (12) has a piston crown (21), a wall region (19b) of the combustion bowl (19), a circumferential top land (22), and a circumferential ring belt (23) provided with ring grooves,
    the piston ring element (12) has a circumferential cooling channel (27) between the wall region (19b) of the combustion bowl (19) and the ring belt (23), closed with a closure element (26),
    the piston base body (11) and the piston ring element (12) have a circumferential joining seam (28) between the wall region (19b) and the crown region (19a) of the combustion bowl (19), in each instance, by way of which seam they are non-releasably connected with one another,
    the joining seam (28) forms an acute angle (α) with the longitudinal axis (M) of the piston (10).

2. Piston according to claim 1, wherein the closure element (26) is held on the piston ring element (12) in the region of the ring belt (23).

3. Piston according to claim 1, wherein the end (28a) of the joining seam (28) on the cooling channel side lies outside of the cooling channel (27).

4. Piston according to claim 3, wherein the free edge (26a) of the closure element (26) is disposed above the joining seam (28).

5. Piston according to claim 1, wherein the closure element is configured as a one-piece or multi-piece sheet-metal component.

6. Piston according to claim 1, wherein the closure element is configured as a one-piece or multi-piece spring sheet and lies against the piston (10) with its free edge (26a), under bias.

7. Piston according to claim 1, wherein the closure element (26) has at least one entry opening (31) that is provided with a sleeve-shaped guide element (32) for the cooling oil that projects into the cooling channel (27).

\* \* \* \* \*